(12) United States Patent
Alkhabbaz et al.

(10) Patent No.: US 10,559,146 B2
(45) Date of Patent: Feb. 11, 2020

(54) ROLE-BASED LOCKING SYSTEM FOR PLANTS UNATTENDED PREMISES

(71) Applicant: Saudi Arabian Oil Company, Dhahran (SA)

(72) Inventors: Fouad M. Alkhabbaz, Qatif (SA); Hussain Al-Salem, Dammam (SA); Zakarya A. Abu Al Saud, Saihat (SA); Nabil J. Ouchn, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 50 days.

(21) Appl. No.: 15/839,368

(22) Filed: Dec. 12, 2017

(65) Prior Publication Data

US 2019/0180539 A1 Jun. 13, 2019

(51) Int. Cl.
*G07C 9/00* (2020.01)
*G06K 9/00* (2006.01)
*H04W 12/08* (2009.01)

(52) U.S. Cl.
CPC ..... *G07C 9/00158* (2013.01); *G06K 9/00006* (2013.01); *G06K 9/00597* (2013.01); *G07C 9/00142* (2013.01); *H04W 12/08* (2013.01)

(58) Field of Classification Search
CPC .................................................. G07C 9/00158
See application file for complete search history.

(56) References Cited

U.S. PATENT DOCUMENTS

| 6,106,032 | A | 8/2000 | Och |
| 9,396,599 | B1 * | 7/2016 | Malhotra ........... G07C 9/00174 |
| 9,760,075 | B2 | 9/2017 | Fisher-Rosemont |
| 2012/0172085 | A1 * | 7/2012 | Vuppu .................. G06F 1/3231 455/556.1 |

(Continued)

FOREIGN PATENT DOCUMENTS

EP 1612741 1/2006

OTHER PUBLICATIONS

International Search Report and Written Opinion issued in International Application No. PCT/US2018/062819 dated Mar. 8, 2019, 14 pages.

*Primary Examiner* — Joseph H Feild
*Assistant Examiner* — Pameshanand Mahase
(74) *Attorney, Agent, or Firm* — Fish & Richardson P.C.

(57) ABSTRACT

The present disclosure describes computer-implemented methods, computer program products, and computer systems, for role-based plants unattended premises occupancy monitoring, mapping, and events logging. One computer implemented method includes unlocking a mechanical door controllable by a computing device upon successfully validating login information input by an occupant, performing an occupancy footprint mapping (OFM) by periodically calculating the occupant's location using a triangulation process, determining an identity of the occupant based a received RFID signal, identifying a job role for the occupant based on the occupant's identity, identifying a normal OFM associated with the occupant's job role, calculating a devia- (Continued)

tion between the OFM and the normal OFM, sending a security event including the OFM to a Syslog server and an object linking, and sending an embedding for process control alarm to a human machine interface if the deviation exceeds a predetermined deviation tolerance threshold.

20 Claims, 14 Drawing Sheets

(56) References Cited

U.S. PATENT DOCUMENTS

| | | | |
|---|---|---|---|
| 2013/0088429 A1* | 4/2013 | Yang | G06F 1/3231 |
| | | | 345/158 |
| 2014/0240088 A1* | 8/2014 | Robinette | G08B 13/1427 |
| | | | 340/5.61 |
| 2015/0109104 A1* | 4/2015 | Fadell | G08B 27/003 |
| | | | 340/5.65 |
| 2015/0116111 A1 | 4/2015 | Foster | |
| 2015/0195789 A1* | 7/2015 | Yoon | G06F 3/0488 |
| | | | 345/173 |
| 2017/0061715 A1* | 3/2017 | Busch-Sorensen | |
| | | | G07C 9/00111 |

\* cited by examiner

| | Common Area 102 | Computer Deck 104 | Power / UPS 106 | Field Cabling & Instrumentation 108 |
|---|---|---|---|---|
| Occupant A | X | X | | |
| Occupant B | X | | X | X |
| Occupant C | X | X | | X |
| Occupant D | X | | X | X |

130

FIG. 1C

ROLE-BASED LOCKING SYSTEM FOR PLANTS UNATTENDED PREMISES

BACKGROUND

Industrial plants around the world can include commonly unattended premises such as substations, emergency shelters and process interface buildings (PIBs), which house important equipment and circuitry to monitor and control processes. The equipment in these premises can be diverse and used for different purposes, such as information technology (IT), process control, process instrumentation, heating ventilation & air conditioning (HVAC), lighting and plumbing. Because these premises are usually unattended and they can house important equipment, reliable physical security mechanism may be needed that can control, monitor and track personnel access to these premises based on their job role description and authority. For example, a process control engineer's access to an industrial plant may be controlled or monitored to ensure safe operations of the plant. In some cases, a "tracking" mechanism can also be performed thus establishing or supporting a forensic platform to conduct incident investigations.

The identification of authorized individuals and subsequent allowance or rejection of access can be executed in various ways along with multiple layers of protection. In some cases, there is also a need to track and record access to particular areas of a PIB for auditing, compliance and forensics purposes. Having reliable, auditable physical security measures and an accurate record of PIB area access can improve industrial plant safety and the compliance rate for security policy. They can also establish a forensic platform for incident investigation and handling.

SUMMARY

The present disclosure describes an intelligent role-based locking system for Process Interface Building (PIB) security.

In an implementation, a mechanical door controllable by a computing device is unlocked upon successfully validating login information input by an occupant. Based on occupant's job role description, movements are being monitored and tracked against designated areas of the PIB. An occupancy footprint mapping is performed by periodically calculating the occupant's location using a triangulation process based on signals sensed by one or more occupancy sensors. An identity of the occupant is determined based a received RFID signal. A job role for the occupant is identified based on the occupant's identity by a role-based access control (RBAC) authentication server. A normal OFM associated with the occupant's job role stored in a central server is identified. A deviation between the OFM and the normal OFM is calculated. A security event including the OFM is sent to a Syslog server, and an object linking and embedding for process control (OPC) alarm is sent to a human machine interface if the deviation exceeds a predetermined deviation tolerance threshold.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 1C is a table outlining an example of role-based access control, according to some implementations of the present disclosure.

Like reference numbers and designations in the various drawings indicate like elements.

DETAILED DESCRIPTION

Figure 1A:
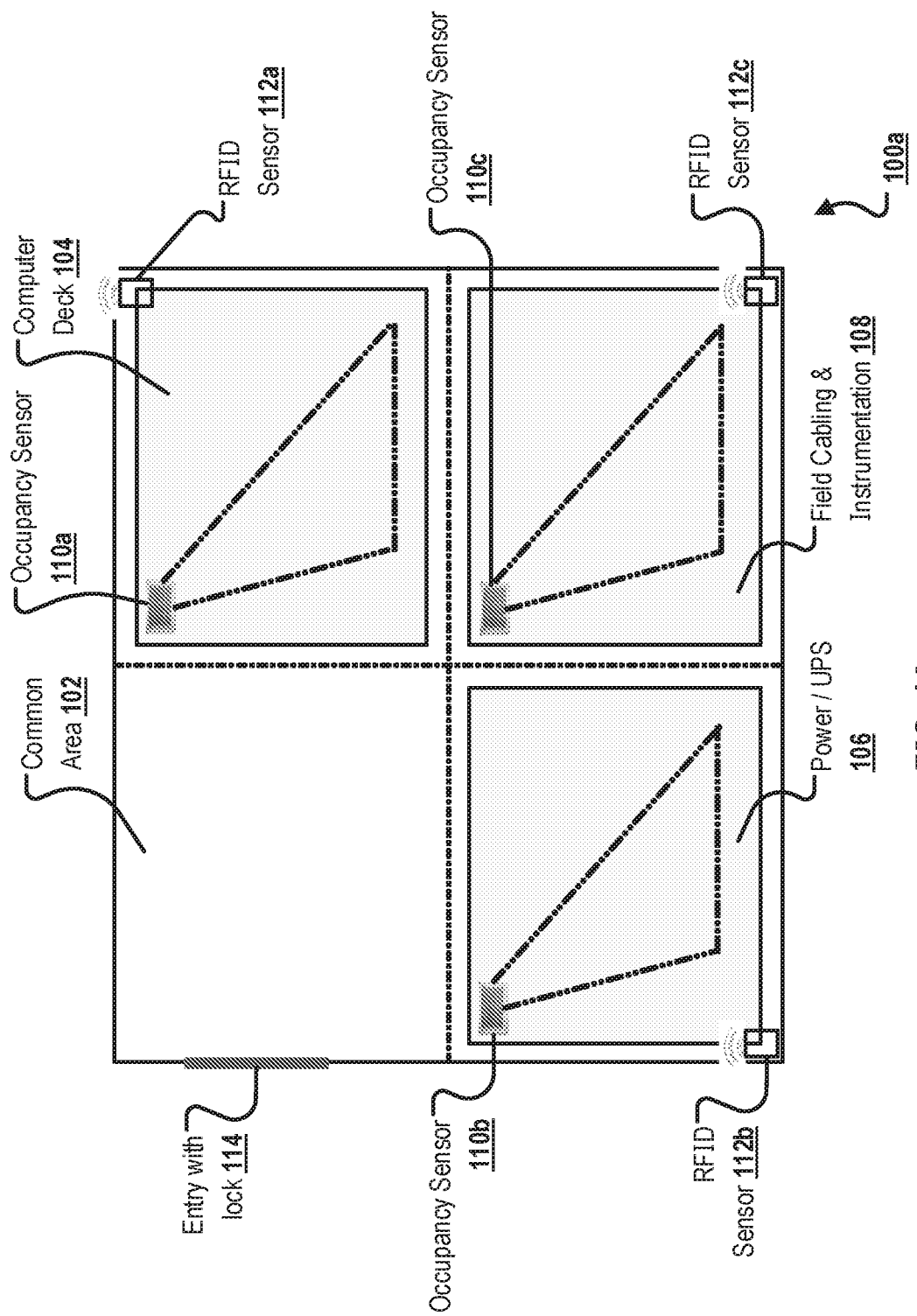
FIG. 1A is a schematic diagram illustrating an example of a Process Interface Building (PIB), according to some implementations of the present disclosure.

The following detailed description describes technologies related to a role-based locking system that can perform functions such as occupancy monitoring, mapping, and events logging. The detailed description is presented to enable a person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, the locking system can be a process interface building (PIB) intelligent locking system (PIB-Lock+) for unattended control buildings. The PIB-Lock+ can be based on Object linking and embedding for Process Control (OPC)-Syslog. The PIB-Lock+ can provide role-based access control (RBAC) triggered by data generated and analyzed through occupancy sensing, AAA, and electronic recording and logging instrumentations.

In some implementations, the PIBs that house important plant systems (for example, field wiring racks) and automation systems (for example, supervisory control and data acquisition systems (SCADA), distributed control systems (DCS), and emergency shutdown systems) can be gated by a role-based door locking mechanism. The role-based door locking mechanism can provide role-based access control (RBAC). The door locking mechanism can include integrated multiprotocol physical security capabilities based on motion detection, radio-frequency identification (RFID) based occupancy sensors, and network authentication and identification information that can be actuated open or closed via centralized authentication, authorization, and accounting (AAA) services.

The locking system described in the present disclosure can be implemented in particular implementations, so as to realize several advantages. The locking system can enable integrated, centralized electronic access based on job role and description. As such, a role-based occupancy foot printing can be monitored, converted to physical occupancy movements and stored in a server. For example, the locking system can be aware of job roles such as "janitor," "HVAC technician," "Process Control engineer," "Plumber," "Instrument Engineer," "IT technician." Depending on the job role, an employee can be permitted to a particular area within the PIB. Moreover, RFID based occupancy sensors and motion detection can monitor vicinity and convey messages back to electronic log if the employee violates an area restriction based on a process of "triangulation". The system can enable integration with the plant security system and trigger an alarm in the event a deviation tolerance threshold is exceeded. Consequently, an operator intervention can be initiated. Other advantages will be apparent to those of ordinary skill in the art.

FIG. 1A illustrates a view 100*a* of an example PIB in an industrial plant. The PIB is located in the industrial plant where multiple processes that control operations of the plant are centralized. The PIB can include multiple areas, for example, four areas: a common area 102, a computer deck 104, a power and uninterruptible power supply (UPS) area 106, and a field cabling and instrumentation area 108. The common area 102 can be a break room where employees can congregate and consume food or beverages. The computer deck 104 can include computers and monitors to provide an interface for operators to control or monitor processes across the plant. The power and UPS area 106 can include an input power source, an electrical apparatus that provides emergency power in the case that the input power source fails, and associated cabling and wiring. The field cabling and instrumentation area 108 can include cabinets with marshalling terminals and system input and output (I/O) and accompanying cabling and wiring for process instruments and powered equipment in the plant. The PIB may include some, all, or none of the identified areas without departing from the scope of the disclosure. Each of the areas can be equipped with occupancy sensors (110*a*, 110*b*, 110*c*), radio-frequency identification (RFID) sensors (112*a*, 112*b*, 112*c*), or both. These sensors can be installed in various places within an area, for example on a wall, on a floor, or on a ceiling. Multiple sensors can be used to locate an occupant within an area. With RFID sensors, multiple occupants within an area can also be distinguishable and identified. The PIB can include an entry with a lock 114 to allow authorized personnel into the PIB.

Figure 1B:
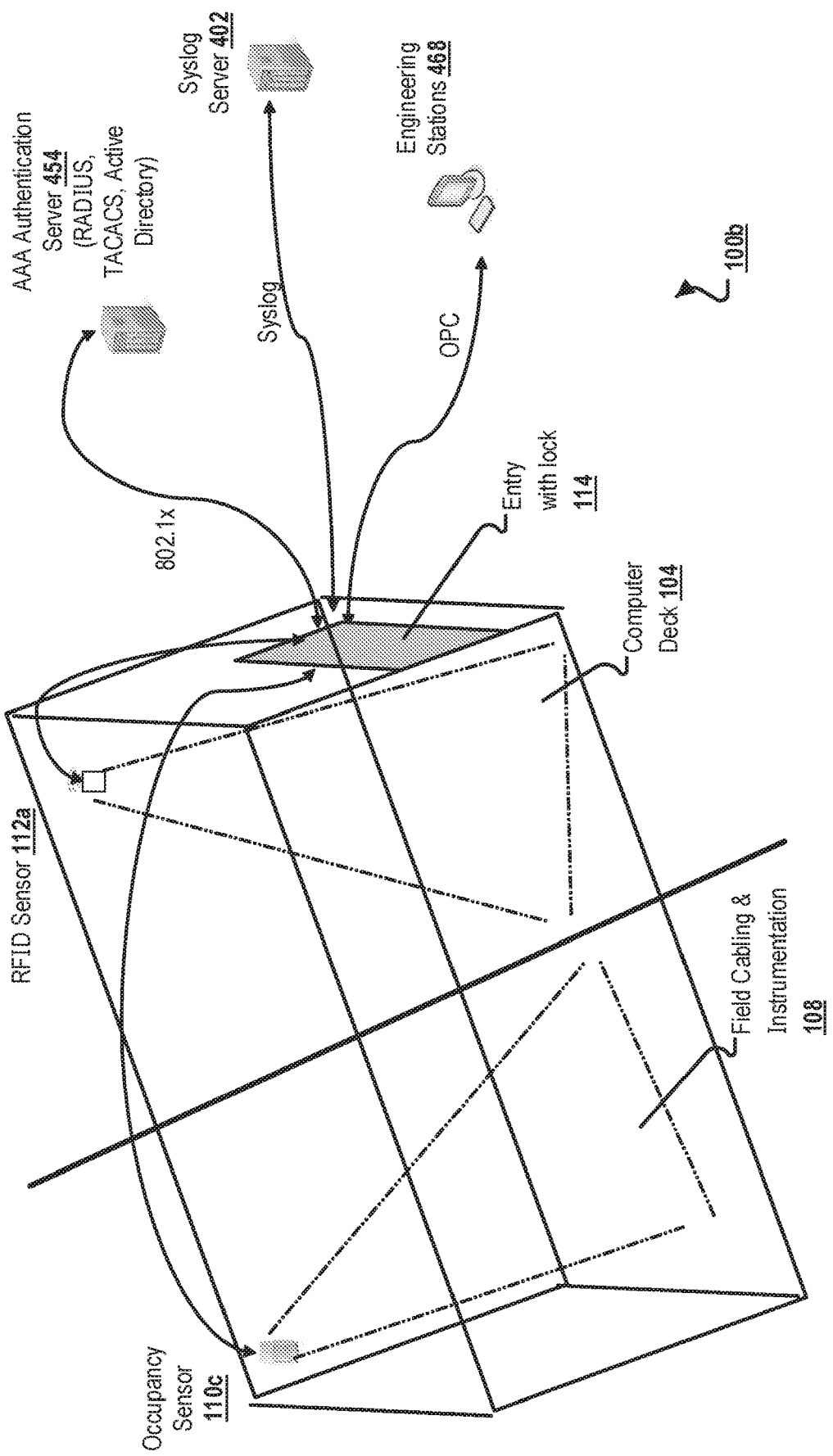
FIG. 1B is a schematic diagram illustrating an example of an area within a PIB, according to some implementations of the present disclosure.

FIG. 1B illustrates another view 100*b* of the PIB in the industrial plant. The entry with lock 114 can receive and send signals to various servers, such as an AAA authentication server (for example, RADIUS, TACACS, and MICROSOFT AD), a Syslog server 402, an engineering station 468, or others. The AAA authentication server 454 can determine whether an individual trying to enter the PIB is authorized for entry and send a positive or negative authentication to the entry with lock 114. The AAA authentication server 454 can be part of a MICROSOFT domain or a RADIUS server authentication server that can implement the 802.1X protocol. A positive authentication can result in unlocking the entry with lock 114. The Syslog server 302 can maintain a log of a multitude of events, such as individual movements, movement patterns, positive authentications, negative authentications, or entries into the PIB. The engineering station 468 can be part of a DCS or SCADA that complies with the OPC standard where operators can supervise and manage various controllers distributed throughout the plant.

FIG. 1C is an example table 130 outlining the areas where various occupants can be expected to visit within a PIB based on the occupants' roles. For example, all occupants can be expected to visit the common area 102 of the PIB. Occupant A can be an operator who monitors various processes in the plant and responds to any upsets or alarms and can therefore be expected to visit the computer deck 104. Occupant B can be a control systems engineer who designs instruments used in controlling various processes and programs their logic functions and can therefore be expected to visit the UPS area 106 and the field cabling and instrumentation area 108. Occupant C can be an electrical engineer and can therefore be expected to visit the field cabling and instrumentation area 108. Occupant D can be a supervisor and can therefore be expected to visit all areas of the PIB.

Figure 2A:
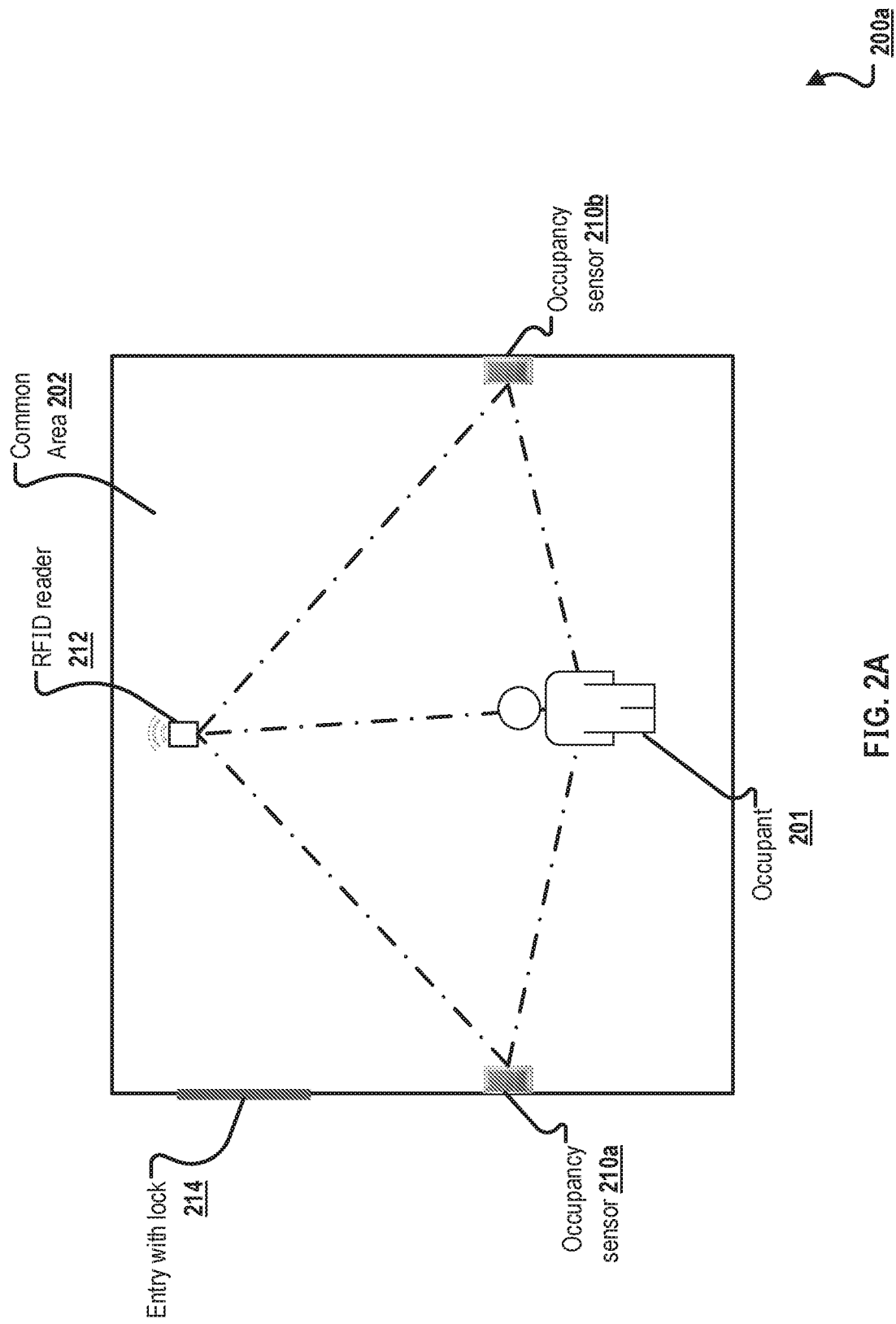
FIG. 2A is a schematic diagram of an example triangulation system to locate and track an occupant, according to some implementations of the present disclosure.

FIG. 2A is a schematic diagram of an example triangulation system 200*a* to locate and track an occupant, according to some implementations of the present disclosure. Triangulation is a method used to determine the position of an object by forming triangles of already determined points. Triangulation method can also determine spatial dimensions and geometry of an object (for example, an employee), track its movements and convert the movements into events. The triangulation system 200*a* can continuously calculate coordinates of the employee and create an occupancy map which can be correlated with a stored normal behavior occupancy map for each employee. The triangulation system can trigger an event and an OPC alarm if the correlation exceeds a predetermined deviation tolerance threshold.

In the triangulation system 200a shown in FIG. 2A, the occupant 201 is the object to be positioned. The position of the occupant in a common area 202 can be represented by its positioning coordinates. The already determined points include an RFID sensor 212, such as a RFID Active tag reader 212 and two occupancy sensors 210a, 210b, such as two ultrasound proximity sensors.

The RFID Active tag reader 212 can be used to identify identities when multiple occupants are present in the same area. The RFID Active tag reader 212 can also determine a distance from each occupant and associate the occupant with its corresponding position determined based on the occupancy sensors 210a, 210b.

The occupancy sensors 210a, 210b can be used to track movements of the occupant 201. The triangulation system 200a can perform a triangulation process to continuously calculate the coordinates of the occupant 201 that represent the occupant's footprint in the PIB. The triangulation process can be performed using different sensors or based on different methods using different devices, as long as the resulting coordinates can be used to represent the occupant's 201 footprint or signature per unit of time. The occupant footprint per unit of time can be converted to timestamped occupant footprints to generate an occupant footprint mapping of the occupant 201.

For example, thermo-imaging cameras may be used instead of the occupancy sensors 210a, 210b. The thermo-imaging cameras can detect radiation in a long-infrared range of the electromagnetic spectrum and produce images of warm-blooded beings (that is, humans or animals) that can be seen in environment with or without visible illumination. A detailed occupancy map can be generated when movements of the images are plotted on a (x,y) plane of the room. In some cases, thermo-imaging cameras can also be used to detect overheating equipment or unusual heat sources.

In some implementations, the PIB-Lock+ system can include one or more external cameras, RFIDs and motion detectors to monitor activities outside of the unattended premises. The external cameras can be programmed to take snapshots of individuals detected to be with certain proximity of the premises using motion detection sensors. External RFIDs maybe used to identify the individuals who approach the premises.

In some implementations, the information collected by the outside detectors and cameras can also be archived for potential forensic processes as part of an incident response procedure. The archived information can be regularly pushed through a plant network to the centralized syslog server to avoid local information seizure.

As another example, piezoelectric sensors may be used to calculate the positioning coordinates of the occupant. Piezoelectric sensors can convert mechanical force such as the weight of a person, into an electrical charge, and map the charges in combination with a superimposed "frequency" assigned for different tiles that form the occupancy map. The piezoelectric sensors can additionally predict the weight of the person inside the room as the magnitude of charge produced is directly proportional to the amount of force exerted. In some implementations, the predicted weight of the person can be used to assist in identification of a person in forensic investigations.

Figure 2B:
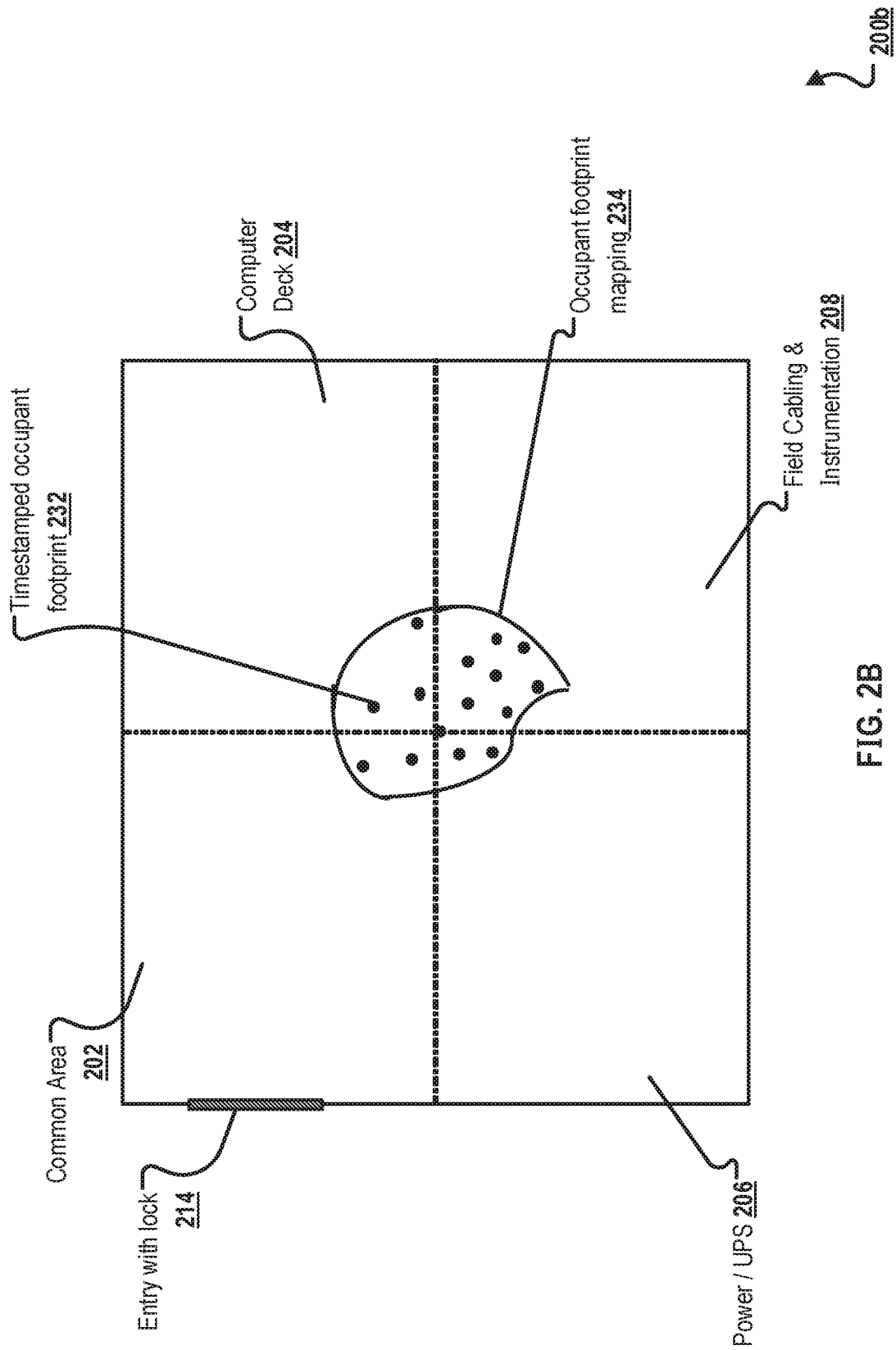
FIG. 2B is a schematic diagram of an example image of an occupancy footprint mapping, according to some implementations of the present disclosure.

FIG. 2B is a schematic diagram of an example image 200b of an occupancy footprint mapping 234, according to some implementations of the present disclosure. The occupant footprint mapping 234, or occupancy map, includes more than one timestamped occupant footprint 232 determined based on a triangulation process, as discussed in the description of FIG. 2A. The occupant footprint mapping 234 can indicate the corresponding occupant's movements over time in a PIB that includes a common area 202, a computer deck 204, a power and UPS area 206, a field cabling and instrumentation area 208, and an entry with lock 214. The occupant footprint mapping 234 can be used by security and forensic applications.

The occupant footprint mapping 234 can be the boundary that contains the timestamped occupant footprints 232 of the occupant. It may be updated in real-time based on the movement and the corresponding timestamped footprint 232 left by the occupant. The occupant footprint mapping 234 can then be correlated with a stored "normal behavior" occupancy map for each occupant. In some implementations, if a PIB-Lock+ determines that an occupant deviates from their "normal boundary" or "normal behavior" by a certain deviation tolerance threshold (for example, 5%), the system may generate a security event and save to a Syslog server, and send an OPC alarm to the HMI operator workstation. For example, if an HVAC technician spends 90% of his time on the computer deck 204, the behavior may be abnormal and the correlation between his occupant footprint mapping 234 and the "normal behavior" occupancy map may exceed the deviation tolerance threshold. An event may be triggered and saved to the Syslog, and the OPC alarm may go off. In some cases, the saved Syslog can be used for forensic procedures.

In some implementations, depending on the alarm levels (for example, low or high), the operator can intervene or invoke different options. For example, the operator can send a signal to force the PIB door to shut until plant security attend to the situation. Alternatively or additionally, the operator can interact with PIB occupants through voice enabled closed circuit television (CCTV) and obtain more information from the occupants as to inquire about suspicious behaviors.

Figure 3:
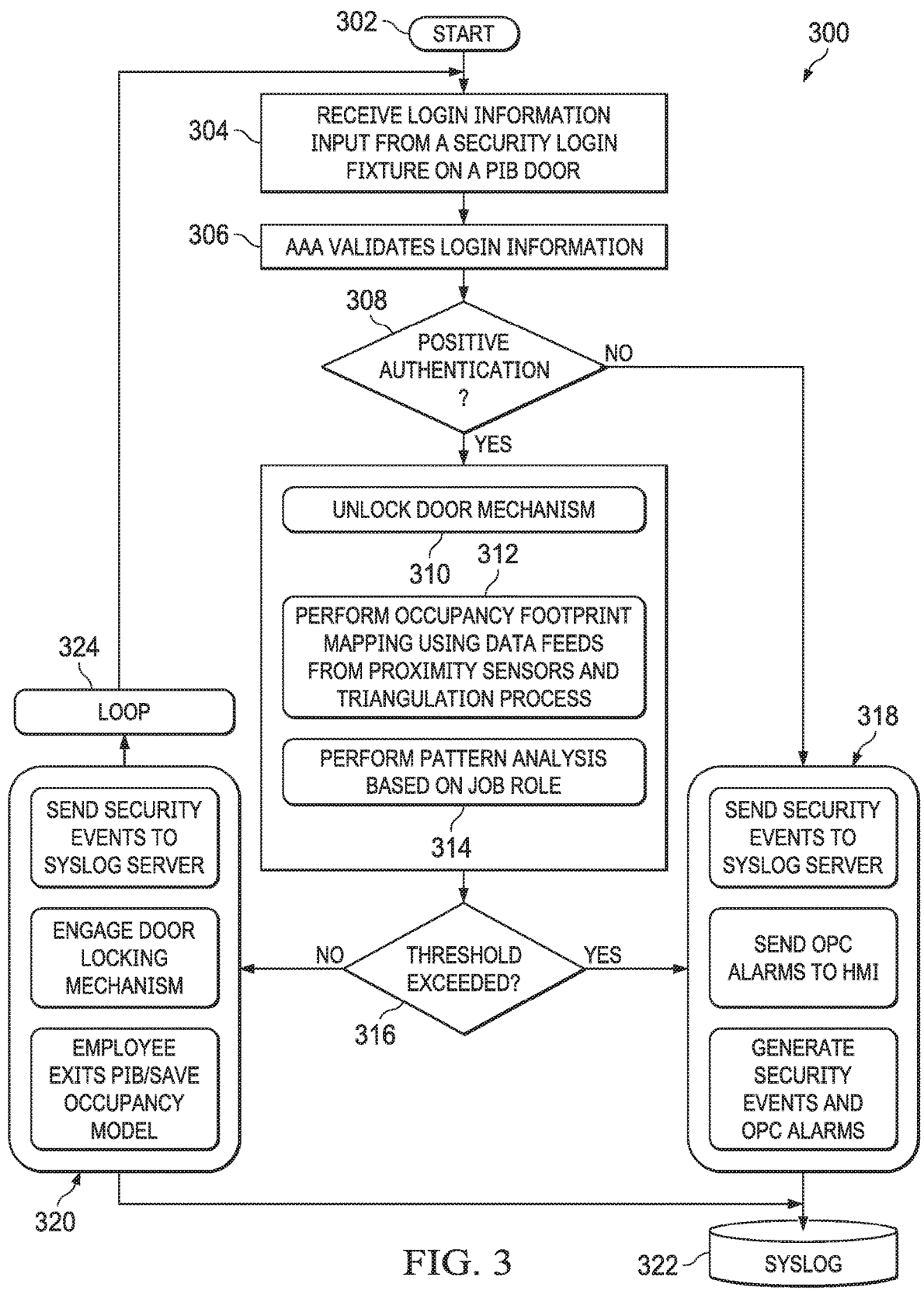
FIG. 3 is a flowchart illustrating an example method for maintaining physical security of a PIB, according to some implementations of the present disclosure.

FIG. 3 is a flowchart of an example method 300 for maintaining physical security of a PIB, according to some implementations of the present disclosure. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

The method 300 starts at 302. For example, an employee of the plant PIB may approach a PIB door that includes a locking mechanism. From 302, method 300 proceeds to 304.

At 304, login information input from a security login fixture on the PIB door is received. The security login fixture can be any authentication apparatus such as a keypad on the door, a biometric sensor (for example, an iris scanning sensor or a fingerprint sensor), or any other mechanisms that can be communicably coupled to a role-based authentication server that can verify employee identity and the corresponding job role. In some implementations, the role-based authentication server may be proprietary or industry based RBAC server. Example RBAC servers may include RADIUS, TACACS, that incorporate the RBAC functionality. From 304, method 300 proceeds to 306.

At 306, the login information is validated based on AAA. The AAA service can be provided by both the authentication apparatus and the role-based authentication server which associates the employee to their role-based access information to one or more areas of the PIB. The authentication apparatus can collect the employee's login information and pass it to the role-based authentication server. The server may identify whether the employee's identity information exists in an identity information database. If it does, the server may associate a job role to the employee based on the record in the database and provide positive authentication. From 306, method 300 proceeds to 308.

At 308, a determination is made as to whether the AAA provides positive authentication. If it is determined that the authentication is positive, method 300 proceeds to 310. Otherwise, if it is determined that the authentication is negative, method 300 proceeds to 318.

At 310, the door mechanism of the PIB door is unlocked. Upon obtaining positive authentication from the authentication server, a signal can be sent to open the PIB door. Method 300 proceeds to 312

At 312, occupancy footprint mapping is performed using data feeds from proximity sensors and a triangulation process. The proximity sensors may be the sensors discussed in the description of FIG. 2A, which can sense the employee's relative location from the sensors. The triangulation process may be used to calculate time stamped footprints or positions of the employee in the PIB based on data feeds from the proximity sensors. The occupancy footprint mapping can then form footprint map or pattern based on the time stamped footprint of the employee. From 312, method 300 proceeds to 314.

At 314, pattern analysis is performed based on the job role of the employee. In some implementations, the pattern analysis can be based on comparing the real-time occupant footprint mapping with the employee's role-based "normal behavior", as discussed in the description of FIG. 2B. In some implementations, the footprint pattern of the employee can be normalized about certain areas of the PIB based on his job role. For example, if the employee is a process control engineer, then his footprint pattern can be normalized around the process control area. If the employee is an HVAC technician, then his footprint pattern can be normalized around the area of air conditioning. The normalized pattern can be compared with a "normal behavior" pattern of the employee's job role pre-stored in a database. A deviation tolerance threshold between the normalized pattern and the pre-stored "normal behavior" pattern may be pre-determined by an administrator of the PIB-Lock+ system. From 314, method 300 proceeds to 316.

At 316, a determination is made as to whether the deviation from the employee's footprint pattern to the pre-stored "normal behavior" pattern exceeds a predetermined deviation tolerance threshold. The predetermined deviation tolerance threshold may be configurable by a system administrator or an HMI operator. If it is determined that the threshold has been exceeded, method 300 proceeds to 318. Otherwise, if it is determined that the threshold has not been exceeded, method 300 proceeds to 320.

At 318, a security event is generated and sent to a Syslog server to be saved, and an OPC alarm is generated and sent to the HMI operator workstation for acknowledgment or escalated processes. The Syslog server can be any computing device that consolidates security logs using syslog standard protocol. The system administrator can monitor one central logging system and interface it with an analyzing system, such as the security information and event management (SIEM), to make the correlation of the security logs for better security management.

In some implementations, the system administrator can have privileged access to all network and computer components of the PIB-Lock+ including monitoring the security logs, registry configuration, and reporting any unauthorized changes. The monitoring process can be triggered upon PIB or room access, and can be done by different methods such as simple network management probing (SNMP), Windows management instrumentation (WMI), PowerShell scripting, or remote registry queries. Examples of abnormal behavior or potential intrusion can be the detection of a "Y" person login, while the PIB-Lock+ only detects the presence of "X" person in the room.

In some cases, the PIB-Lock+ system can be configured with administrative privileged access to network and computer components inside the premises to monitor their security logs and registry configuration, correlate them with stored OFM and report anomalies and unauthorized changes. Additionally, PIB-Lock+ can detect if a computer has been unplugged using a continuous ping session (heart beat), a new computer has been added using "Admin" access to network switches address table, or a computer has been manipulated using a performance monitoring element, and an abnormal wireless activity that can spoof or jam other computing devices using an onboard wireless spectrum analyzer. Anomalies can be determined by correlative subroutines that can be compared with log events of other network components. For example, PIB-Lock + can report a potential identity-theft based intrusion based on detecting a login from "John", while the PIB-lock+ can only detect the presence of "Jane" in the premise. The OFM process can be a function of PIB-Lock+. The OFM can be stored in plants primary PIB-Lock+, or co-exist with an authentication server.

The PIB-Lock+ can record culprit MAC addresses and types of wireless transmissions (For example, Bluetooth, WIFI, NFC, etc.) In some cases, the PIB-Lock+RBAC can also be extended to guard in-room cabinets such as control cabinets, instrumentation cabinets, IT cabinets holding fiber optic patch telephony, and can detect if an unauthorized cabinet has been forcibly opened. PIB-Lock+ may also be interfaced with instrumentations such as dust, heat and humidity and acoustic sensors which could be used to identify adverse environmental conditions or abnormal sounds (malfunctioned computer fan or equipment bearing)

In some cases, the security event may be generated to be OPC standard compliant. When the security event is generated as a result of negative authentication, it can mean that either a wrong password was inputted or the employee does not exist on the role-based authentication server. The OPC alarm may go off, indicating that someone anonymous is trying to access the PIB. When the security event is generated as a result of the employee behavior exceeding the tolerance threshold, the operator may further investigate the abnormal behavior or perform other appropriate actions. From 318, method 300 proceeds to 322, where the security event of the employee's occupancy map and abnormal behavior is saved to the Syslog server.

At 320, the door locking mechanism is engaged when the employee exits the PIB, and the employee's occupancy model and the security events corresponding to the employee's exit are saved to the Syslog server at 322. The employee's occupancy model may include their occupancy map and timestamped footprints. After 320, method 300 proceeds to 324.

At 324, a new loop begins where the PIB-Lock+awaits to receive login information input on the PIB door.

In some implementations, more than one employee may be in the PIB at the same time. An RFID Active reader may be installed in one or more areas of the PIB to identify the employees and associate their identities with their corresponding occupancy model. The pattern analysis may be performed separately for each employee. The security events may also be stored separately, corresponding to different employees, on the Syslog server. The RFID Active reader can also determine a distance from each occupant and associate the occupant to their corresponding position determined based on the occupancy sensors 210a, 210b.

Figure 4:
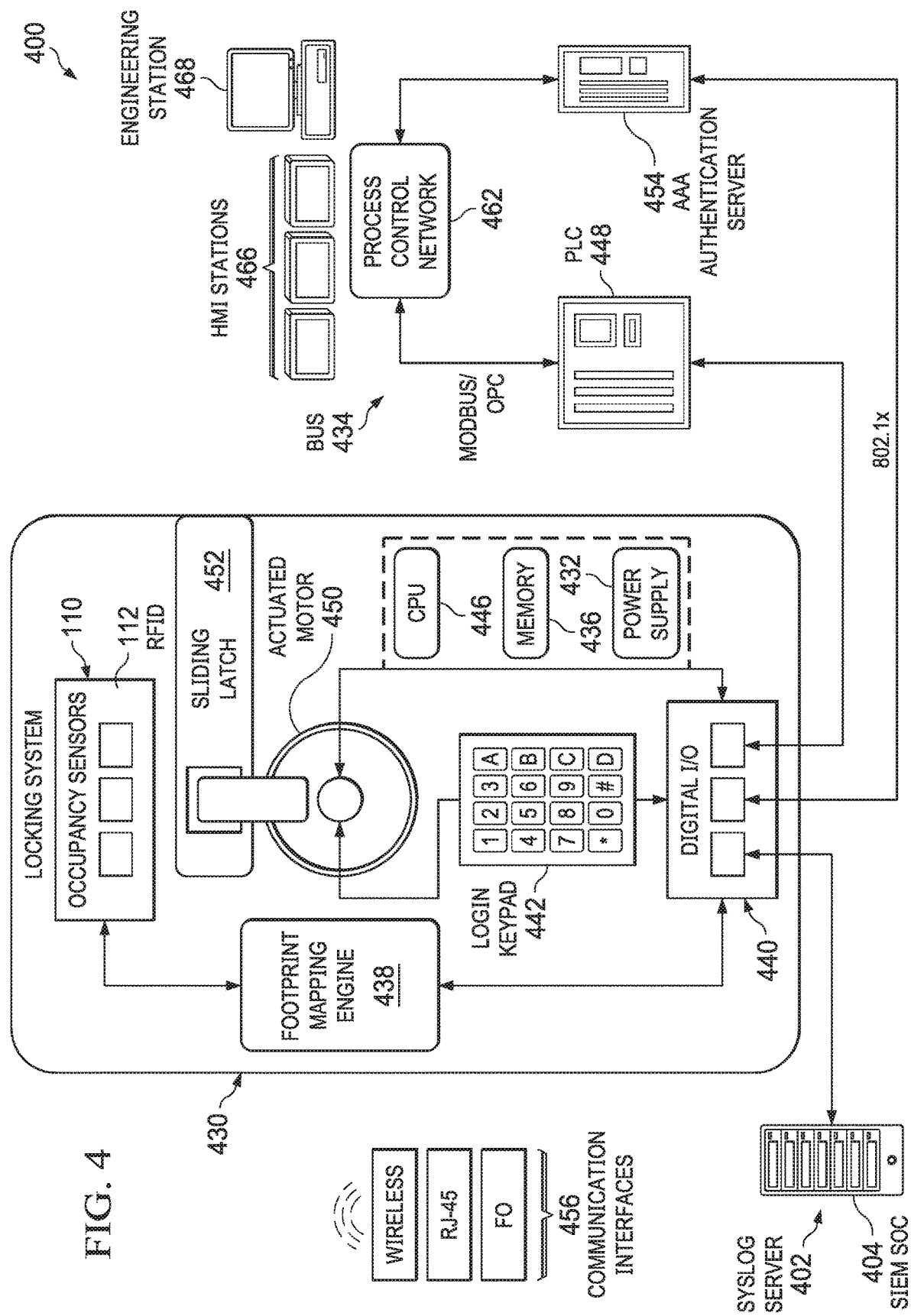
FIG. 4 is a schematic diagram illustrating an example PIB locking system, according to some implementations of the present disclosure.

FIG. 4 is a schematic diagram illustrating an example PIB locking system 400, according to some implementations of the present disclosure. At a high-level, the locking system 430 includes occupancy sensors 110, RFID reader 112, a login keypad 442, a sliding latch 452, an actuated motor 450, a footprint mapping engine 438, a digital input/output (I/O) interface 440, a CPU 446, a memory 436, and a power supply 432.

In the example PIB locking system 400, the main lock mechanism is an actuated motor 450 attached to a sliding latch 452, powered by the power supply 432. The locking system 400 can be supported by different power sources such as AC, onboard battery, or power over Ethernet. The actuated motor 450 is a motor controlled by an actuator that can rotate left or right, to laterally slide the sliding latch 452 to a close or open position, similar to a shaft. The lock is in an open position as shown in FIG. 4. When the motor 450 is actuated to rotate to the right, the sliding latch 452 will slide to the right to lock the door. The actuator can receive analog or digital signals from power supply unit (PSU) or a remote terminal unit (RTU) through one or more communication interfaces 456. The communication interfaces 456 may be any interfaces that can transmit signals such as wireless interface (for example, Wi-Fi), RJ-45, and FO.

Figure 5:
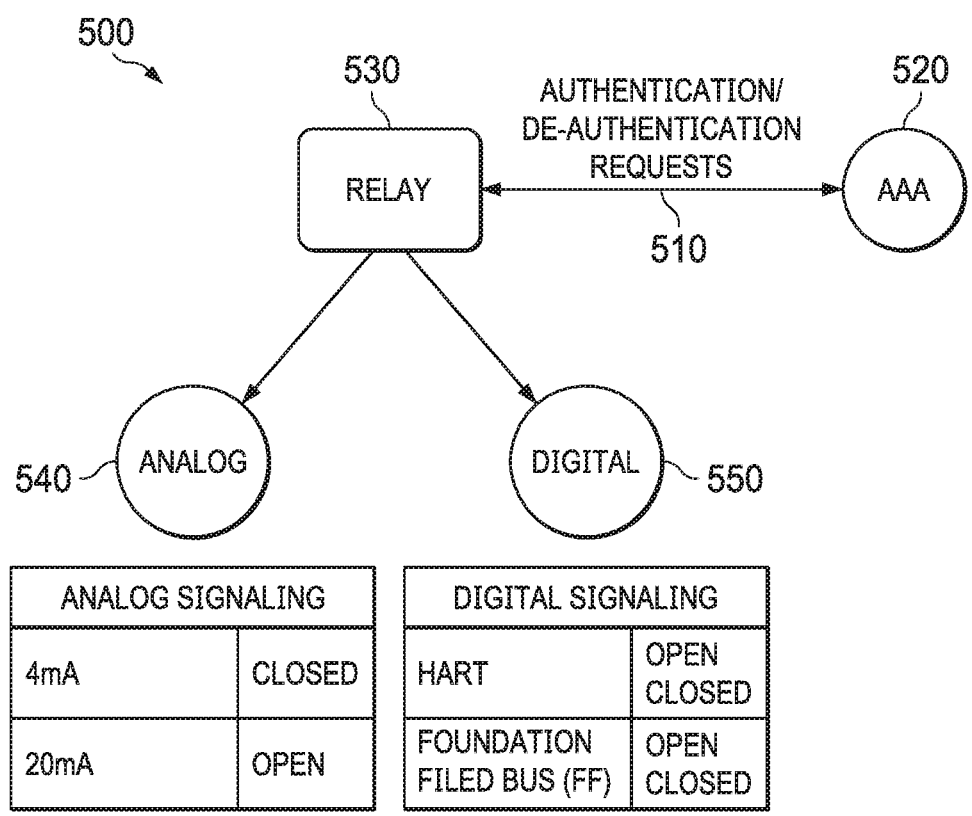
FIG. 5 is a schematic diagram illustrating example signaling used by a locking mechanism, according to some implementations of the present disclosure.

Briefly referring to FIG. 5, FIG. 5 is a schematic diagram illustrating example signaling 500 used by a locking mechanism, according to some implementations of the present disclosure. The authentication and de-authentication requests or messages 510 can be communicated between an AAA 520 and a locking mechanism through a relay 530. The messages 510 can be converted into analog signals 540 (for example, 4-20 mA) or 550 digital signals such as the highway addressable remote transducer (HART) signal to control an actuated motor and drive the locking mechanism to an open or closed position.

In some implementations, the actuator can receive messages from an AAA or 802.1X authentication server 454 to actuate the motor to slide the latch 452 open upon successful employee authentication. The authentication or de-authentication messages received from the AAA can be "packet based". The messages can be converted (for example, using the relay 530) to either analog or digital signals that the lock actuator or motor can understand and act upon. The AAA authentication server 454 can be part of a Microsoft domain or a radiant server authentication server that can implement the 802.1X protocol.

In some implementations, the door locking mechanism can be actuated based on an authentication or de-authentication request from an AAA server with a "manual" override control from inside the PIB. The AAA services can be implemented via a custom design authentication system that includes fields such as "ID", "Password", "Job Role", "Privilege group", or they can utilize solutions such as remote authentication dial-in user service (RADIUS), terminal access controller access-control system (TACACS) and active directory (AD), etc. The system can be based on a multiprotocol suite including Syslog and OPC for event registering, conveying, and tracking.

Syslog is a protocol that can be used to convey event notification messages from a client to be stored in an event consolidating server. Syslog protocol can be used by the PIB-Lock+ to store logging events onto a plant centralized server. OPC is a software interface standard that allows communication with industrial hardware devices such as programmable logic controllers. The OPC standard can be used by PIB-Lock+ to exchange alarm messages to a human machine interface (HMI) operator workstation on the DCS or SCADA systems. In some implementations, the PIB-Lock+ can maintain an individual electronic log for each plant employee with security access information including identity, time, date, and purpose of visit for a "particular" PIB it is installed in. Centralized plant logging system (Syslog server) can maintain "plant-wide" individual electronic logs received from other PIB-Lock+ devices installed throughout the plant facility. Any deviation from security policies predetermined for each corresponding plant employee based on their job roles and job descriptions can be proactively reported by embedded forensic intelligence subroutines. Intelligence subroutines can be based on correlation of information extracted from various log entries and events detected throughout the plant. The forensic subroutines can act as a physical intrusion detection system (IDS) that monitors physical room access for malicious activities or policy violations. Detected activity or violation can be reported either to a plant manager or collected using a centralized SIEM system. The SIEM system can combine events and information from multiple sources, and use techniques such as alarm filtering to distinguish malicious activities from events generated by false alarms.

In some implementations, the door locking mechanism utilizes a process control actuator which can directly be controlled through the plant's control system using a Modbus PLC 448 with analogue and digital I/O 440 interface signaling.

Figure 6:
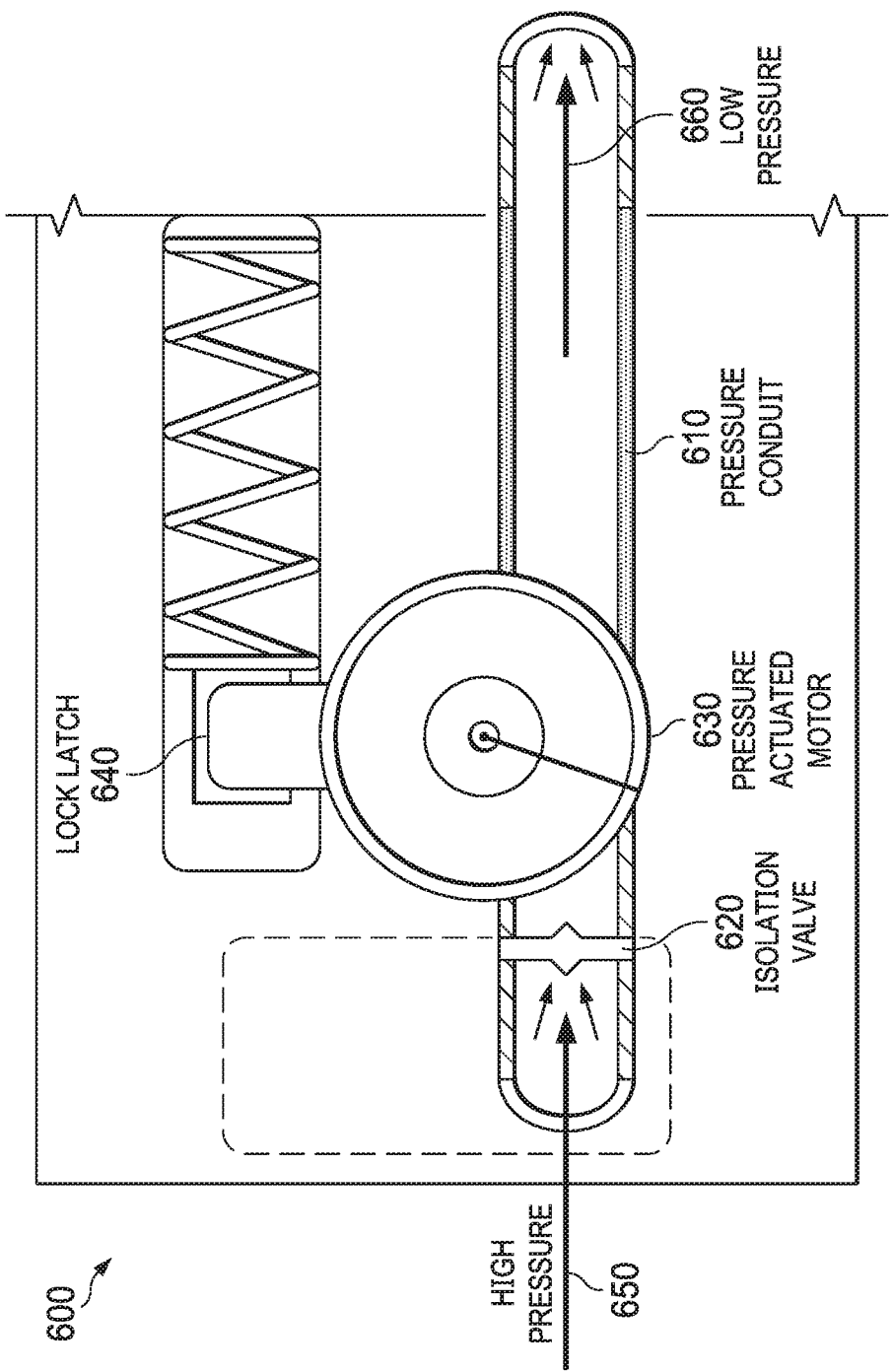
FIG. 6 is a schematic diagram illustrating an example PIB locking system with differential air pressure actuated lock latch, according to some implementations of the present disclosure.

In some implementations, the door locking mechanism can be actuated by use of differential pressure as the force that drives the locks in the open or close position. Briefly referring to FIG. 6, FIG. 6 is a schematic diagram illustrating an example PIB locking system 600 with differential air pressure actuated lock latch, according to some implementations of the present disclosure. In some cases, control rooms can maintain constant positive air pressure inside the room to prevent outside gas, dust, or other air pollutants from entering the room and negatively affect personnel or equipment inside the room. By channeling in the air pressure conduit 610 and controlling the air pressure conduit 610 using an isolation valve 620, a high pressure region 650 and a low pressure region 660 can be created. The force generated by difference in pressures can be concentrated and focused to drive a pressure actuated motor 630 to control the lock latch 640 to an open or closed position.

Figure 7:
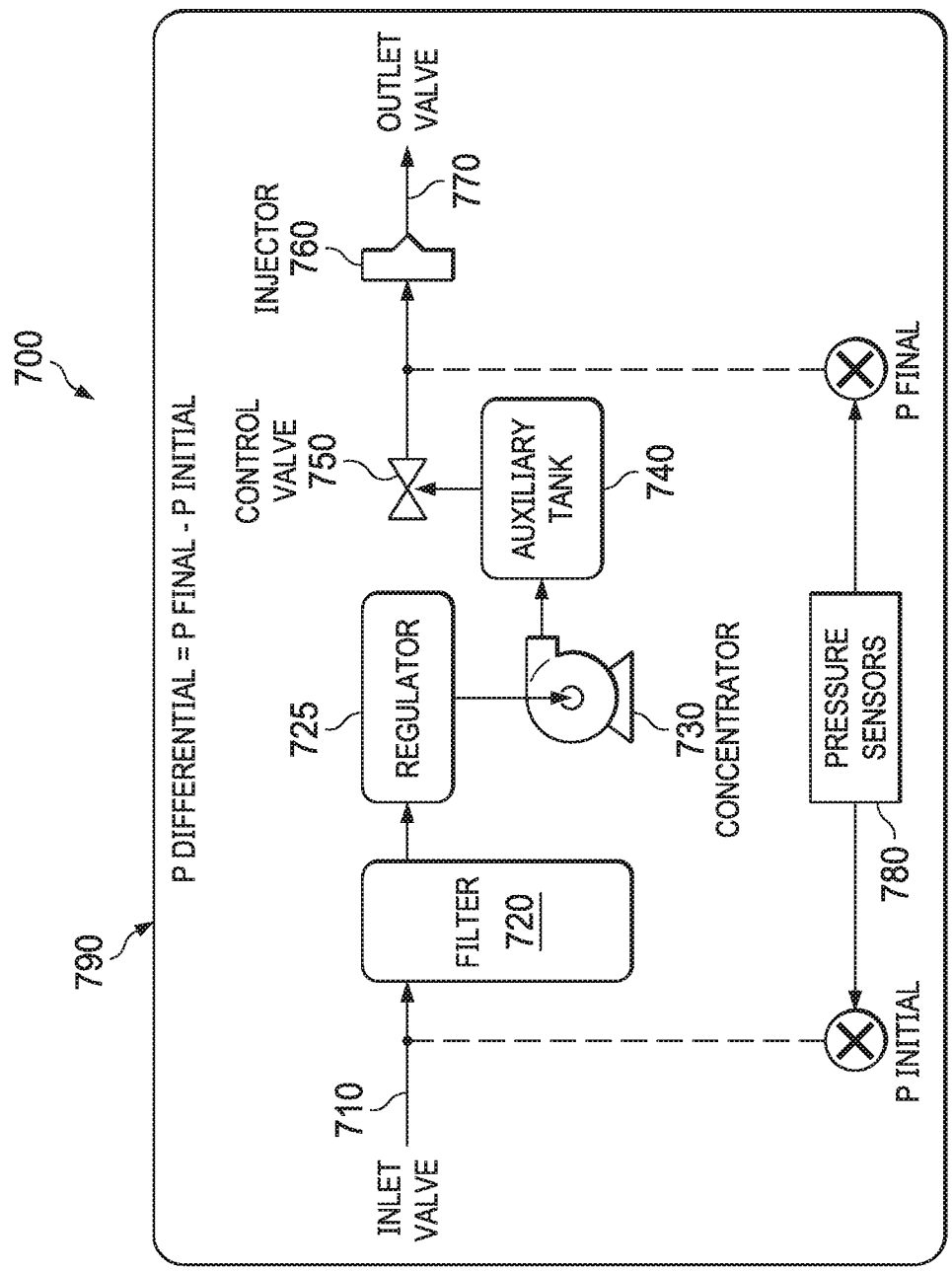
FIG. 7 is a schematic diagram illustrating an example PIB locking system 700 with induced pressure actuated lock latch, according to some implementations of the present disclosure.

In some implementations, the door locking mechanism can be actuated by induced pressure. Briefly referring to FIG. 7, FIG. 7 is a schematic diagram illustrating an example PIB locking system 700 with induced pressure actuated lock latch, according to some implementations of the present disclosure. As air is pulled in through an inlet valve 710 and pushed against a cleansing filter 720, clean air can be regulated through a regulator 725 and pushed through a concentrator 730 that can provide the compression before storing it in a pressurized auxiliary tank 740. To open or close the lock latch, the pressurized air can be released from the auxiliary tank 740 through a control valve 750 and pushed through a highly concentrated injector 760 to an outlet valve 770. The compressed air pushed passed the injector 760 and outlet valve 770 can be used to control the lock latch to an open or close position. The example system 700 can also use one or more pressure sensors 780 fitted on the inlet valve 710 and outlet valve 770 to detect the pressure "P initial" at the inlet valve 710 and the pressure "P final" at the outlet valve. The pressure sensors 780 can be used to ensure that the pressure difference 790 between "P initial" and "P final" is within a normal working range.

Referring back to FIG. 4, in some implementations, two or more locking mechanisms may be supported, so that one of them can be used as backup. Security event data, recorded based on the two or more locking mechanisms, can be compared and correlated to further enhance security.

The employee authentication can be based on two types of input, the employee's input on the login keypad 442, and their identity and movements as sensed by the occupancy sensors 110 and RFID reader 112. The occupancy sensors 110 and RFID reader 112 can be any of the sensors discussed in the description of FIG. 2A. The occupancy footprint mapping will start based on the employee's movements sensed by the occupancy sensors 110. The footprint mapping engine can receive telemetry from the sensors and use the triangulation process to create an occupancy map for the employee identified by the RFID reader 112.

The footprint mapping engine 438 can also engage the CPU 446 to perform pattern analysis based on comparing the real-time occupant footprint mapping with the employee's role-based "normal behavior" as discussed in the description of FIG. 2B. In some implementations, the footprint pattern of the employee can be normalized about a certain area of the PIB based on their job role. For example, if the employee is a process control engineer, then their footprint pattern can be normalized around the process control area. The normalized pattern can be compared with a "normal behavior" pattern of the employee's job role. The employee's role-based normal behavior can be determined and provided by the role-based AAA authentication server 454 such as a RBAC, RADIUS or DA that complies with the 802.1x standard. The role-based AAA authentication server 454 is a centralized authentication server that houses employee accounts, credentials, and privilege level information for computer systems, network equipment and PIB-Lock+ locking mechanism.

A deviation tolerance threshold between the normalized pattern and the pre-stored "normal behavior" pattern may be pre-determined by an administrator of the locking system 430. If the deviation tolerance threshold is exceeded, a special security event that includes an occupancy model can be generated and sent to a Syslog server 402. The PIB-Lock+ can generate various event types including room access (for example, Ins and Outs of the room), individual movements, time spent, access approvals or denials. The PIB-Lock+ can convey all event types to the Syslog or selected event types to the Syslog. The Syslog server 402 can be paired with an SIEM 404 software or system to manage and analyze security events recorded in the Syslog server 402. In some cases, the security event may be locally archived in memory 436 or downloaded to memory from the Syslog server via the digital I/O 440. In addition, an OPC alarm of a security event can be generated and sent to an HMI operator workstation 466 through a programmable logic controller (PLC) 448 that provides integrated communication to all related devices and a system bus 434 based on Modbus/OPC standard. The operator can either acknowledge the abnormal behavior based on the employee's job role or perform further actions such as investigation. The engineering station 468 can be a DCS or SCADA that complies with the OPC standard where operators can supervise and manage various controllers distributed throughout the PIB.

OPC and Syslog alarms can digitally notify different types of events. OPC low-low (LL) alarm can indicate a "for-information" type of event that needs an acknowledgement but not further intervention or escalation. A "high-high (HH)" alarm can be indicative of a more serious event that requires more substantial actions. A "HH" alarm may not be just simply acknowledged. The operator can take further steps such as conducting a series of actions to respond to the event, perform direct intervention, or invoke escalated processes.

Figure 8:
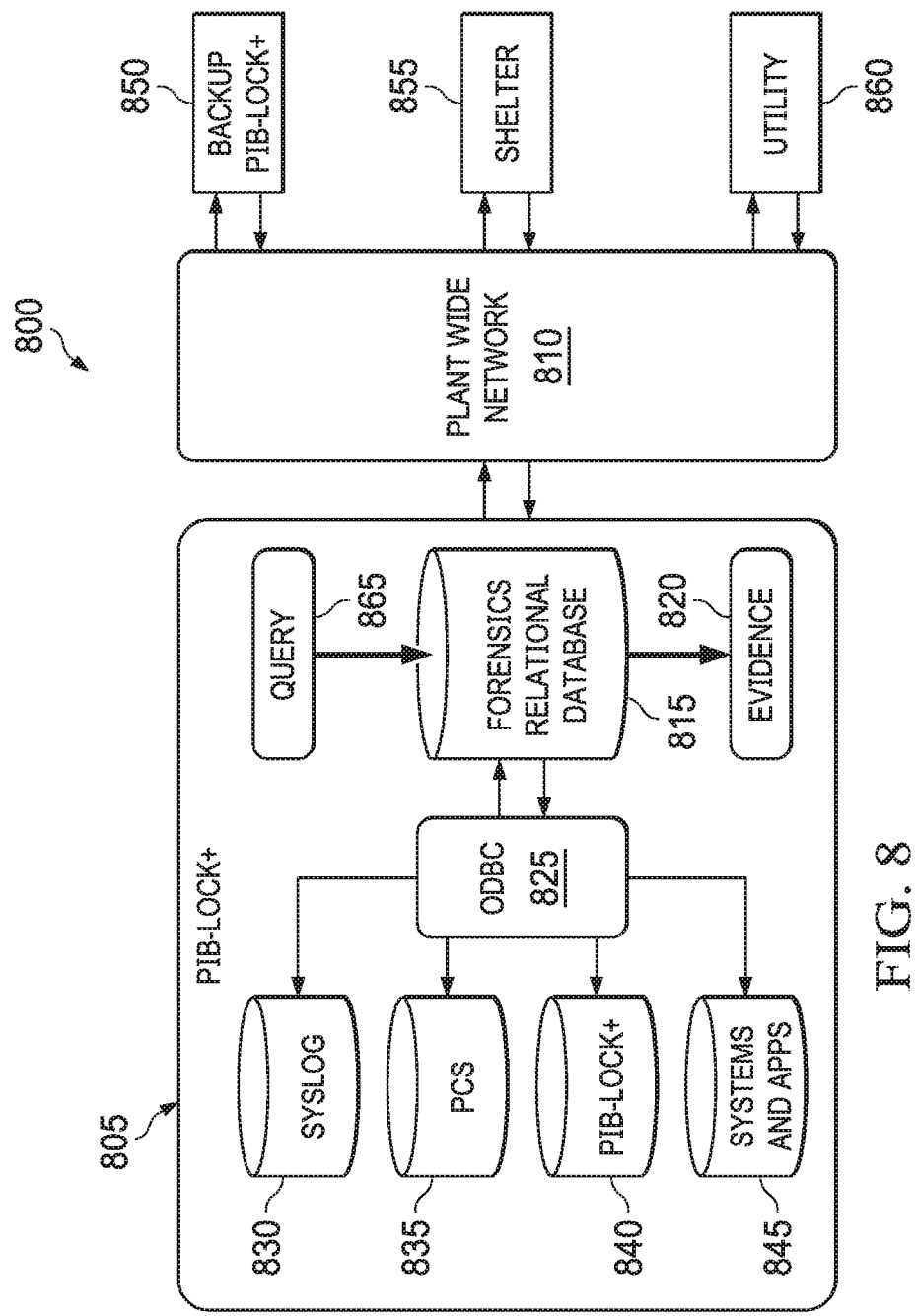
FIG. 8 is a schematic diagram illustrating an example system for inter-plant forensic data exchange, according to some implementations of the present disclosure.

Briefly referring to FIG. 8, FIG. 8 is a schematic diagram illustrating an example system 800 for inter-plant forensic data exchange, according to some implementations of the present disclosure. An PIB-Lock+ 805 can be connected to a plant wide network 810 using multi-support to standard information and industrial communication protocols. The PIB-Lock+ 805 can exchange data with a plurality of different systems such as a back-up PIB-Lock+ node 850, a shelter system 855, and a utility system 860. For example, the PIB-Lock+ 805 can correlate information gathered from systems registries, logs, system events and configuration files to build a forensic relational database 815. The forensic relational database 815 can include potential evidence 820 that can be used to answer queries 865 in forensic investigations. The PIB-Lock+ 805 can use open database connectivity (ODBC) 825 as an open standard application programming interface (API) for accessing files in different databases such as Access, dBase, DB2, Excel, and Text databases. The databases can reside in systems throughout the plant such as process control (PCS) 830, Syslog 835, other PIB-Lock+ nodes 840, and plant network systems and applications 845.

Data exchange between the PIB-Lock+ 805 can also be extended beyond a control system. As a control system can be interfaced with other control system PIB-Locks+ through standard interfaces, such as HTTP, FTP, OPC, or serial link (for example, RS 425). Data transfer across control systems can be used to enhance data reporting and event correlation quality.

The PIB-Lock+ 805 can be architected in "Primary" and "Backup" node configurations. The "Primary" node can be responsible to store OFM' s and query other PIB-Lock+ nodes for information reporting consolidation and correlated forensic findings. The "Primary" and "Backup" role assignment can be automatically performed based on an inter node voting process. In some cases, a user can also optionally force role assignment based on operational needs.

Referring back to FIG. 4, in some implementations, a computer screen can be installed in the HMI operator workstation 466 to display local configuration, hardware and software status, error log, details of a number of previous entries to the PIB, available resources, and network connection status. The workstation 466 may also have on-demand voice and video capabilities for the operator to issue voice or video instructions. In some implementations, the communications between the locking system 430, PLC 448, the HMI workstation 466, and the AAA authentication server 454 can be controlled by a process control network 462.

In some implementations, an encryption module can be used to encrypt the communications, to further enhance security. The encryption module can use public key encryption, private key encryption, or symmetrical encryption. The encryption module can be programmed by a PIB-Lock+ system administrator.

In some implementations, the PIB-Lock+ can determine room occupancy or system utilization of the rooms in the PIB building. The room occupancy or system utilization percentage of a certain room (for example, control system area, instrumentation area, IT area, HVAC area, janitor area etc.) can be compared to other rooms to help future capacity planning and transportation. The PIB-Lock+ can also be interfaced with a UPS to generate power outage alarms and provide power outage statistics that can be used to provide a global power management for plant facilities.

In some implementations, the PIB-Lock+ can also be used to control room environment and lighting. The PIB-Lock+ can send or accept OPC-based notifications and commands to report or control: (1) lighting intensity, including identifying abnormal lighting intensity for potential equipment malfunction and sending a maintenance service request if abnormal lighting intensity is detected; (2) room temperature or humidity, including identifying an abnormal rise in room temperature or humidity for potential equipment malfunction and adjusting the room temperature via thermostat control; (3) noise, including identifying abnormal noise for potential equipment malfunction; (4) smoke detection and reporting; and (5) power, including shutting down unnecessary services such as lighting during logouts, supply power to AC, or lighting when people enter certain areas of the PIB.

In some implementations, the PIB-Lock+ can also be used to provide location services for employees. Location services can further be used to provide general statistics of areas of the plant for maintenance planning, transportation planning, and room and facility sizing.

In some implementations, the PIB-Lock+ may include a management of change (MoC) systems to identify if a certain visit to the PIB is part of a scheduled plan. The PIB-Lock+ can also send SMS and email alerts, determine most visited rooms, and locate employees in different rooms of the PIB.

In some implementations, the PIB-Lock+ can include one or more self-protection mechanisms. For hardware protection, the hardware components such as CPU 446, memory 436, and digital I/O interface 440 can each be assigned a hardware digital ID. As such, any communications in or out of the hardware component can be signed with and verified against. The hardware protection measure can protect the locking system 430 from unwanted intervention or manipulation. For software protection, software components such as the operating system (OS), applications, plugins, and network drivers can be digitally identified and verified. For system tampering protection, a protective "seal" can be installed on a box that houses the system devices that need to be protected. The "seal" can be electronically guided and operated. When the "seal" is broken (for example, when opening the box), an electronic flag can be sent to a "hardware whitelisting" sub-routine to report potential tampering. The "seal" logic and mechanism can be powered by an internal battery to ensure continuous operations.

In some implementations, a reporting mechanism can be established to generate reports and communicate through SNMP traps, OPC or XML files. Report interface from the control network can generate appropriate reporting files or traps to be communicated using different protocols such as OPC and SNMP. The report can be shared with different levels of technical, management, or other plant personnel. Examples of such reports can include monthly reports of access and occupancy to a PIB. Reports can also include visit requests, new access grants, new access restrictions, risk analysis for decision making, key performance indicators (KPI's), viewing figures, and numbers and charts for planning and scheduling. In some cases, reports can also be forensic reports that highlight anomalies such as access denies, deviations from normal pattern, or discovery of rogue devices and wireless networks.

Figure 9:
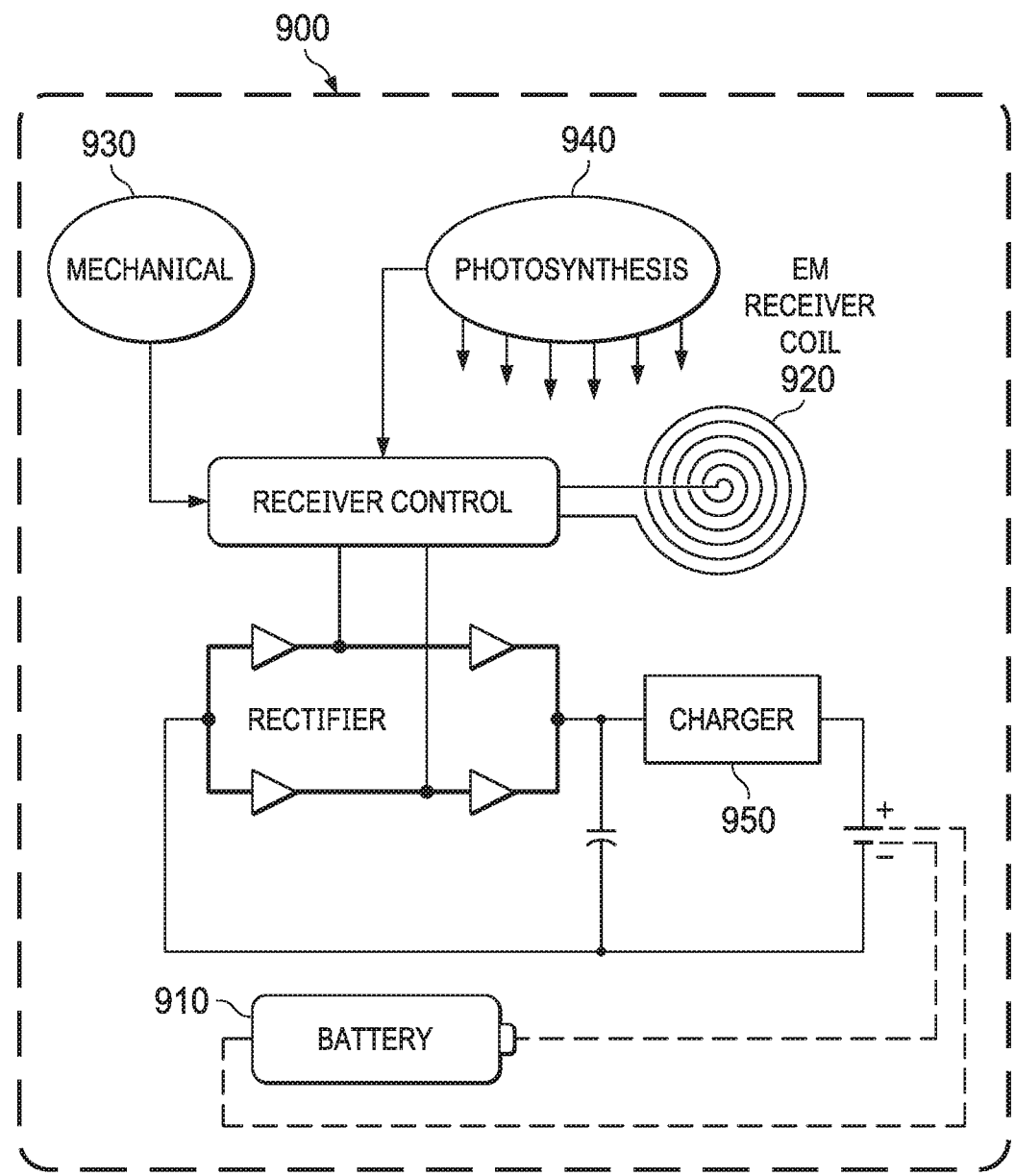
FIG. 9 is a schematic diagram illustrating an example of an ambient energy collector 900, according to some implementations of the present disclosure.

FIG. 9 is a schematic diagram illustrating an example of an ambient energy collector 900, according to some implementations of the present disclosure. The example ambient energy collector 900 can be included in the PIB-Lock+ as a self-preservation mechanism for power independency. The ambient energy collector 900 can harness stray energy in electromagnetic fields generated by equipment such as generators or transformers, and store the stray energy as auxiliary power. Depending on the environment where PIB-Lock+ is deployed, various types of energy forms can be harnessed and used by a charger 950 to charge the battery 910 to prolong its operation. For example, PIB-Lock+ can be installed where electromagnetic fields are present in strengths where some of its energy can be captured using an induction coil 920. Electromagnetic fields can be generated in proximity of electrical devices such as motors, generators, and transformers. PIB-Lock+ devices installed in proximity of electrical devices can benefit from the stray energy for battery charging.

Another form of energy can be mechanical 930 generated from mechanical devices such as pumps or compressors where vibration is prevalent. The energy in vibration can be harnessed using vibration powered generators such as piezoelectric crystals that converts mechanical forces into electric current to charge the battery 910. Vibration powered generators can include a resonator used for amplifying the vibration source and a transducer mechanism which can convert the energy from vibrations to electrical energy. The transducer can include a magnet and coil or a piezoelectric crystal.

In some implementations, the PIB-Lock+ may also use photosynthesis energy 940 emitted by room lighting and mechanical energy as main door opens and closes. The generated auxiliary power can be used to power the PIB-Lock+ in situations where power is cut-off during potential PIB-Lock+ bypass attempts.

In some implementations, the amount of harnessed energy can be measured to provide additional measures for room occupancy and utilization. The harnessed energy can also be used in forensic investigations where lighting may be purposefully turned off to disguise suspicious activities.

The accuracy of the PIB-Lock+ occupancy and footprint mappings can be determined by scan cycles. A scan cycle can be defined as the number of triangulated position calculation per unit of time. The higher the scan cycle, the higher the accuracy. After the conclusion of a room visit, the PIB-Lock+ can save the accumulated positions calculated based on scan cycles as an occupancy image or model.

Figure 10:
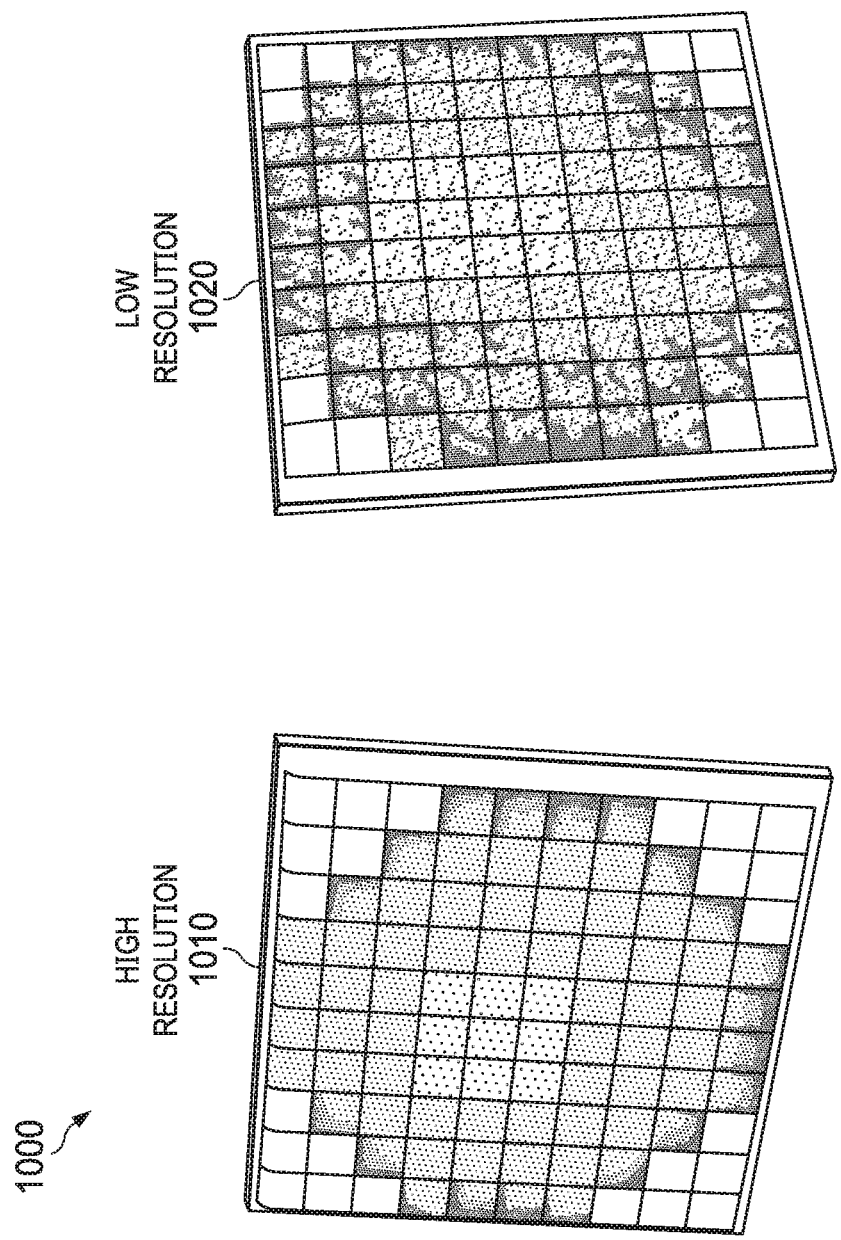
FIG. 10 is a schematic diagram illustrating example resolutions for movement patterns, according to some implementations of the present disclosure.

Briefly referring to FIG. 10, FIG. 10 is a schematic diagram illustrating example resolutions 1000 for movement patterns, according to some implementations of the present disclosure. In some implementations, the occupancy mapping digital image resolution can be achieved in pixel per inch (PPI) as each "movement" can be represented by a "pixel" in the digital image. The resolution of the image can be determined by the number of pixels per inch in a digital image. A high resolution image 1010 has higher PPI, which include more details and higher accuracy. A low resolution image 1020 has lower PPI, which include less details and lower accuracy. Occupancy patterns with higher PPI can produce clearer and more detailed output.

In some implementation, the PIB-Lock+ can apply additional tones and color to the occupancy image. For example, the color "red" can be used to highlight perimeters, "green" can be used to highlight area of jurisdiction, and "amber" can used to highlight areas of concern. It is to be understood that based on the complexity of the premises, PIB-Locks+ can be equipped with higher resolution imaging capability and more colors. In some implementations, lower spatial resolutions can be used by the PIB-Lock+ to determine occupancy mapping for control rooms with less frequent visitors, based on operational needs, or efficiency of available computational and communication resources.

Figure 11:
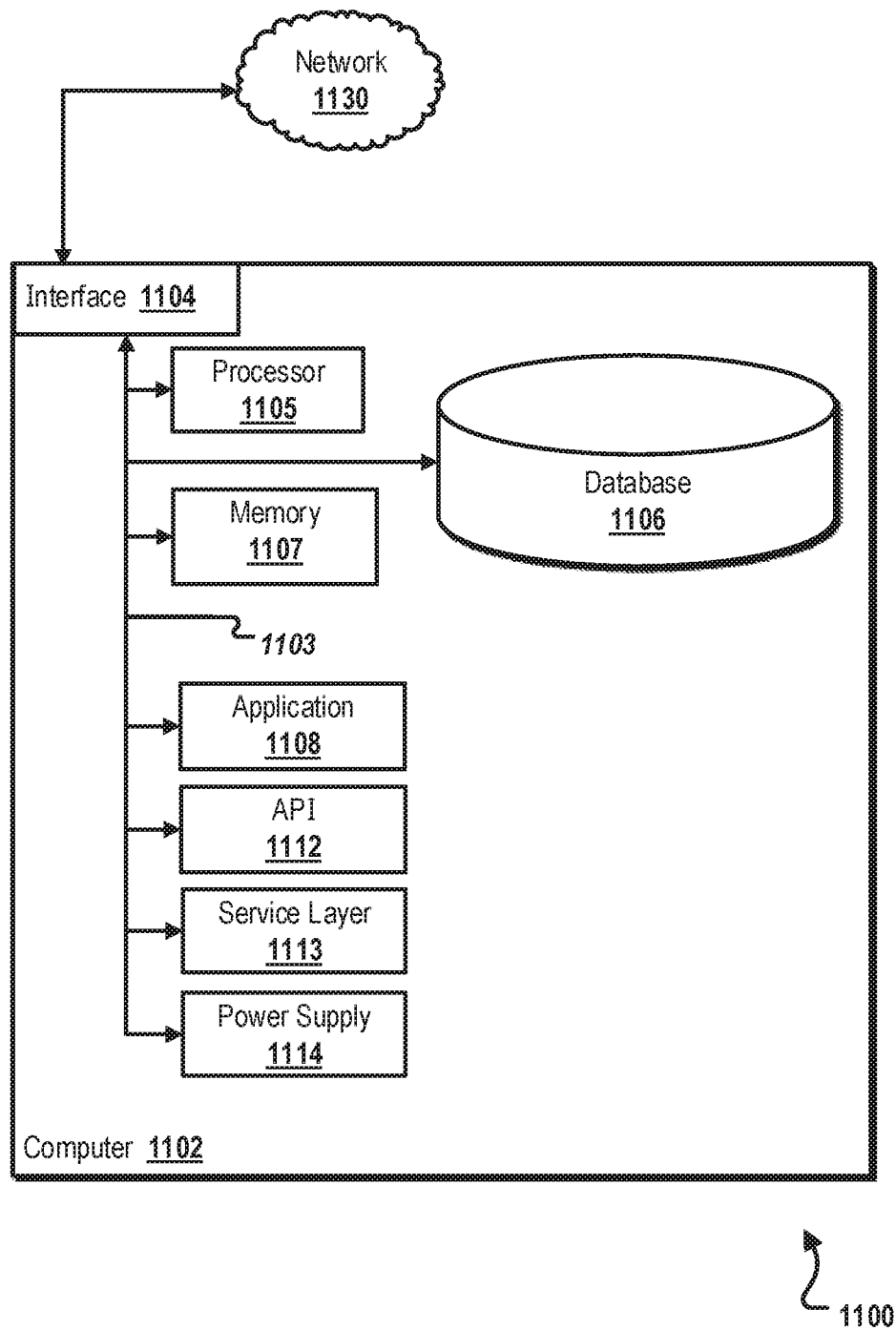
FIG. 11 is a block diagram illustrating an example computer system used to provide computational functionalities associated with described algorithms, methods, functions, processes, flows, and procedures as described in the instant disclosure, according to some implementations of the present disclosure.

In some implementation, the PIB-Lock+ can recognize emergency evacuation by disengaging the locking mechanism and drive the door open. In the meantime, the event tracking and movement mapping functions can be uninterrupted. But the occupants may not be asked to logout from the locking mechanism during the emergency period. Because the PIB-Lock+ supports OPC and Syslog, it can receive and interpret events generated from the plant's emergency shutdown system (ESD), and receive direct commands from an operator or Syslog events generated by compatible systems that can notify the existence of an emergency within the plant premises. Once the emergency is cleared, the PIB-Lock+ can automatically readapt by performing login and logout procedures. FIG. 11 is a block diagram of an example computer system 1100 used to provide computational functionalities associated with described algorithms, methods, functions, processes, flows, and procedures, as described in the instant disclosure, according to some implementations of the present disclosure. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 may comprise a computer that includes an input device, such as a keypad, keyboard, touch screen, or other device that can accept user information, and an output device that conveys information associated with the operation of the computer 1102, including digital data, visual, or audio information (or a combination of information), or a graphical user interface (GUI).

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, hardware or software (or a combination of both hardware and software), may interface with each other or the interface 1104 (or a combination of both), over the system bus 1103 using an API 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 comprises logic encoded in software or hardware (or a combination of software and hardware) and is operable to communicate with the network 1130. More specifically, the interface 1104 may comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102.

The computer 1102 also includes a memory 1107 that can hold data for the computer 1102 or other components (or a combination of both) that can be connected to the network 1130 (whether illustrated or not). For example, memory 1107 can be random access memory (RAM), read-only memory (ROM), optical, magnetic, and the like, storing data consistent with this disclosure. In some implementations, memory 1107 can be a combination of two or more different types of memory (for example, a combination of RAM and magnetic storage) according to particular needs, desires, or particular implementations of the computer 1102 and the described functionality. Although illustrated as a single memory 1107 in FIG. 11, two or more memories 1107 (of the same or combination of types) can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 may be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There may be any number of computers 1102 associated with, or external to, a computer system containing computer 1102, each computer 1102 communicating over network 1130. Further, the term "client," "user," and other appropriate terminology may be used interchangeably, as appropriate, without departing from the scope of this disclosure. Moreover, this disclosure contemplates that many users may use one computer 1102, or that one user may use multiple computers 1102.

Described implementations of the subject matter can include one or more features, alone or in combination.

For example, in a first implementation, a computer-implemented method, comprising: unlocking a mechanical door controllable by a computing device upon successfully validating login information input by an occupant; performing an occupancy footprint mapping (OFM) by periodically calculating the occupant's location using a triangulation process based on signals sensed by one or more occupancy sensors; determining an identity of the occupant based a received RFID signal; identifying a job role for the occupant based on the occupant's identity; identifying a normal OFM associated with the occupant's job role stored in an authentication server; calculating a deviation between the OFM and the normal OFM; sending a security event including the OFM to a Syslog server; and sending an object linking and embedding for process control (OPC) alarm to a human machine interface if the deviation exceeds a predetermined deviation tolerance threshold.

The foregoing and other described implementations can each, optionally, include one or more of the following features:

A first feature, combinable with any of the following features, wherein the login information is input through a keypad attached to the mechanical door.

A second feature, combinable with any of the previous or following features, wherein the login information is input through a biometric sensor attached to the mechanical door, wherein the biometric sensor is at least one of a voiceprint sensor, fingerprint sensor, or an iris scanner.

A third feature, combinable with any of the previous or following features, wherein the computing device that controls the mechanical door runs a security configuration software that resolves a logic of securing a locking mechanism of the mechanical door.

A fourth feature, combinable with any of the previous or following features, wherein the authentication server is a remote authentication dial-in user service server, a terminal access controller access-control system server or an active directory server.

A fifth feature, combinable with any of the previous or following features, wherein the computing device that controls the mechanical door runs a process control software that performs at least one of the triangulation process, sending the security event to the syslog server, sending the OPC alarm to the HMI, or providing 802.1x protocol support.

A sixth feature, combinable with any of the previous or following features, wherein the occupancy sensor is an ultrasound proximity sensor, a thermo-image sensor, or a piezoelectric sensor.

A seventh feature, combinable with any of the previous or following features, wherein the mechanical door includes a lock latch actuated by air pressure or induced pressure.

In a second implementation, a non-transitory, computer-readable medium storing one or more instructions executable by a computer system to perform operations, comprising: unlocking a mechanical door controllable by a computing device upon successfully validating login information input by an occupant; performing an occupancy footprint mapping (OFM) by periodically calculating the occupant's location using a triangulation process based on signals sensed by one or more occupancy sensors; determining an identity of the occupant based a received RFID signal; identifying a job role for the occupant based on the occupant's identity; identifying a normal OFM associated with the occupant's job role stored in an authentication server; calculating a deviation between the OFM and the normal OFM; sending a security event including the OFM to a Syslog server; and sending an object linking and embedding for process control (OPC) alarm to a human machine interface if the deviation exceeds a predetermined deviation tolerance threshold.

The foregoing and other described implementations can each, optionally, include one or more of the following features:

A first feature, combinable with any of the following features, wherein the login information is input through a keypad attached to the mechanical door.

A second feature, combinable with any of the previous or following features, wherein the login information is input through a biometric sensor attached to the mechanical door, wherein the biometric sensor is at least one of a voiceprint sensor, fingerprint sensor, or an iris scanner.

A third feature, combinable with any of the previous or following features, wherein the computing device that controls the mechanical door runs a security configuration software that resolves a logic of securing a locking mechanism of the mechanical door.

A fourth feature, combinable with any of the previous or following features, wherein the authentication server is a remote authentication dial-in user service server, a terminal access controller access-control system server or an active directory server.

A fifth feature, combinable with any of the previous or following features, wherein the computing device that controls the mechanical door runs a process control software that performs at least one of the triangulation process, sending the security event to the syslog server, sending the OPC alarm to the HMI, or providing 802.1x protocol support.

A sixth feature, combinable with any of the previous or following features, wherein the occupancy sensor is an ultrasound proximity sensor, a thermo-image sensor, or a piezoelectric sensor.

A seventh feature, combinable with any of the previous or following features, wherein the mechanical door includes a lock latch actuated by air pressure or induced pressure.

In a third implementation, a computer-implemented system, comprising: unlocking a mechanical door controllable by a computing device upon successfully validating login information input by an occupant; performing an occupancy footprint mapping (OFM) by periodically calculating the occupant's location using a triangulation process based on signals sensed by one or more occupancy sensors; determining an identity of the occupant based a received RFID signal; identifying a job role for the occupant based on the occupant's identity; identifying a normal OFM associated with the occupant's job role stored in an authentication server; calculating a deviation between the OFM and the normal OFM; sending a security event including the OFM to a Syslog server; and sending an object linking and embedding for process control (OPC) alarm to a human machine interface if the deviation exceeds a predetermined deviation tolerance threshold.

The foregoing and other described implementations can each, optionally, include one or more of the following features:

A first feature, combinable with any of the following features, wherein the login information is input through a keypad attached to the mechanical door.

A second feature, combinable with any of the previous or following features, wherein the login information is input through a biometric sensor attached to the mechanical door, wherein the biometric sensor is at least one of a voiceprint sensor, fingerprint sensor, or an iris scanner.

A third feature, combinable with any of the previous or following features, wherein the computing device that controls the mechanical door runs a security configuration software that resolves a logic of securing a locking mechanism of the mechanical door.

A fourth feature, combinable with any of the previous or following features, wherein the authentication server is a remote authentication dial-in user service server, a terminal access controller access-control system server or an active directory server.

A fifth feature, combinable with any of the previous or following features, wherein the computing device that controls the mechanical door runs a process control software that performs at least one of the triangulation process, sending the security event to the syslog server, sending the OPC alarm to the HMI, or providing 802.1x protocol support.

A sixth feature, combinable with any of the previous or following features, wherein the occupancy sensor is an ultrasound proximity sensor, a thermo-image sensor, or a piezoelectric sensor.

A seventh feature, combinable with any of the previous or following features, wherein the mechanical door includes a lock latch actuated by air pressure or induced pressure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware-and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    unlocking a mechanical door controllable by a computing device upon successfully validating login information input by an occupant;
    performing an occupancy footprint mapping (OFM) by periodically calculating the occupant's location using a triangulation process based on signals sensed by one or more occupancy sensors, wherein the OFM indicates the occupant's movements over time;
    determining an identity of the occupant based a received RFID signal;
    identifying a job role for the occupant based on the occupant's identity;
    identifying a normal OFM associated with the occupant's job role stored in an authentication server, wherein the normal OFM indicates a normal behavior occupancy map for the occupant's job role;
    calculating a deviation between the OFM and the normal OFM;
    sending a security event including the OFM to a Syslog server; and
    sending an object linking and embedding for process control (OPC) alarm to a human machine interface if the deviation exceeds a predetermined deviation tolerance threshold.

2. The computer-implemented method of claim 1, wherein the login information is input through a keypad attached to the mechanical door.

3. The computer-implemented method of claim 1, wherein the login information is input through a biometric sensor attached to the mechanical door, wherein the biometric sensor is at least one of a voiceprint sensor, fingerprint sensor, or an iris scanner.

4. The computer-implemented method of claim 1, wherein the computing device that controls the mechanical door runs a security configuration software that resolves a logic of securing a locking mechanism of the mechanical door.

5. The computer-implemented method of claim 1, wherein the authentication server is a remote authentication dial-in user service server, a terminal access controller access-control system server or an active directory server.

6. The computer-implemented method of claim 1, wherein the computing device that controls the mechanical door runs a process control software that performs at least one of the triangulation process, sending the security event to the syslog server, sending the OPC alarm to a human machine interface (HMI), or providing 802.1x protocol support.

7. The computer-implemented method of claim 1, wherein the occupancy sensor is an ultrasound proximity sensor, a thermo-image sensor, or a piezoelectric sensor.

8. The computer-implemented method of claim 1, wherein the mechanical door includes a lock latch actuated by air pressure or induced pressure.

9. A non-transitory, computer-readable medium storing one or more instructions executable by a computer system to perform operations comprising:
   unlocking a mechanical door controllable by a computing device upon successfully validating login information input by an occupant;
   performing an occupancy footprint mapping (OFM) by periodically calculating the occupant's location using a triangulation process based on signals sensed by one or more occupancy sensors, wherein the OFM indicates the occupant's movements over time;
   determining an identity of the occupant based a received RFID signal;
   identifying a job role for the occupant based on the occupant's identity;
   identifying a normal OFM associated with the occupant's job role stored in an authentication server, wherein the normal OFM indicates a normal behavior occupancy map for the occupant's job role;
   calculating a deviation between the OFM and the normal OFM;
   sending a security event including the OFM to a Syslog server; and
   sending an object linking and embedding for process control (OPC) alarm to a human machine interface if the deviation exceeds a predetermined deviation tolerance threshold.

10. The non-transitory, computer-readable medium of claim 9, wherein the login information is input through a keypad attached to the mechanical door.

11. The non-transitory, computer-readable medium of claim 9, wherein the login information is input through a biometric sensor attached to the mechanical door, wherein the biometric sensor is at least one of a voiceprint sensor, fingerprint sensor, or an iris scanner.

12. The non-transitory, computer-readable medium of claim 9, wherein the computing device that controls the mechanical door runs a security configuration software that resolves a logic of securing a locking mechanism of the mechanical door.

13. The non-transitory, computer-readable medium of claim 9, wherein the authentication server is a remote authentication dial-in user service server, a terminal access controller access-control system server or an active directory server.

14. The non-transitory, computer-readable medium of claim 9, wherein the computing device that controls the mechanical door runs a process control software that performs at least one of the triangulation process, sending the security event to the syslog server, sending the OPC alarm to a human machine interface (HMI), or providing 802.1x protocol support.

15. The non-transitory, computer-readable medium of claim 9, wherein the occupancy sensor is an ultrasound proximity sensor, a thermo-image sensor, or a piezoelectric sensor.

16. The non-transitory, computer-readable medium of claim 9, wherein the mechanical door includes a lock latch actuated by air pressure or induced pressure.

17. A computer-implemented system, comprising:
   a computer memory; and
   a hardware processor interoperably coupled with the computer memory and configured to perform operations comprising:
   unlocking a mechanical door controllable by a computing device upon successfully validating login information input by an occupant;
   performing an occupancy footprint mapping (OFM) by periodically calculating the occupant's location using a triangulation process based on signals sensed by one or more occupancy sensors, wherein the OFM indicates the occupant's movements over time;
   determining an identity of the occupant based a received RFID signal;
   identifying a job role for the occupant based on the occupant's identity;
   identifying a normal OFM associated with the occupant's job role stored in an authentication server, wherein the normal OFM indicates a normal behavior occupancy map for the occupant's job role;
   calculating a deviation between the OFM and the normal OFM;
   sending a security event including the OFM to a Syslog server; and
   sending an object linking and embedding for process control (OPC) alarm to a human machine interface if the deviation exceeds a predetermined deviation tolerance threshold.

18. The computer-implemented system of claim 17, wherein the login information is input through a biometric sensor attached to the mechanical door, wherein the biometric sensor is at least one of a voiceprint sensor, fingerprint sensor, or an iris scanner.

19. The computer-implemented system of claim 17, wherein the computing device that controls the mechanical door runs a security configuration software that resolves a logic of securing a locking mechanism of the mechanical door.

20. The computer-implemented system of claim 17, wherein the occupancy sensor is an ultrasound proximity sensor, a thermo-image sensor, or a piezoelectric sensor.

\* \* \* \* \*